United States Patent
Kuramochi et al.

(10) Patent No.: US 7,328,272 B2
(45) Date of Patent: *Feb. 5, 2008

(54) APPARATUS AND METHOD FOR ADDING MUSIC CONTENT TO VISUAL CONTENT DELIVERED VIA COMMUNICATION NETWORK

(75) Inventors: Takashi Kuramochi, Hamamatsu (JP); Shigeki Akahori, Hamamatsu (JP)

(73) Assignee: Yamaha Corporation, Hammatsu-shi (JP)

( * ) Notice: Subject to any disclaimer, the term of this patent is extended or adjusted under 35 U.S.C. 154(b) by 564 days.

This patent is subject to a terminal disclaimer.

(21) Appl. No.: 10/108,910

(22) Filed: Mar. 28, 2002

(65) Prior Publication Data

US 2002/0143978 A1  Oct. 3, 2002

(30) Foreign Application Priority Data

Mar. 30, 2001  (JP) .............................. 2001-101892

(51) Int. Cl.
*G06F 15/16* (2006.01)
*G09B 5/00* (2006.01)

(52) U.S. Cl. .................. 709/231; 434/307 A; 709/236
(58) Field of Classification Search ................ 709/231; 455/3.06; 715/716
See application file for complete search history.

(56) References Cited

U.S. PATENT DOCUMENTS 5,734,788 A * 3/1998 Nonomura et al. ......... 386/126
5,810,603 A * 9/1998 Kato et al. ............. 434/307 A (Continued)

FOREIGN PATENT DOCUMENTS

EP  1102238 A2  5/2001

(Continued)

OTHER PUBLICATIONS

Webstage: An Active Media Enhances World Wide Web Browser, Mar. 22, 1997, Yamaguchi, Tomoharu, et al., Kansai C&C Research Laboratories, NEC Corporation.

(Continued)

*Primary Examiner*—William Vaughn
*Assistant Examiner*—Peling A Shaw
(74) *Attorney, Agent, or Firm*—Morrison & Foerster

(57) ABSTRACT

A server receives an acquisition request for visual content, such as desired text or image content, from a client terminal via a communication network, and retrieves, from a database, data of the visual content requested by the client terminal. Then, by analyzing the visual content, by referring to an appropriate table or otherwise, the server determines music content or effect tone content to be imparted to the requested visual content in associated relation to specific substance of the requested visual content. Then, the server retrieves data of the determined music content or effect tone content from a database, and transmits the data of the visual content, along with the data of the music content or effect tone content, to the client terminal. On the basis of the data transmitted by the server, the client terminal can not only visually display the requested visual content but also audibly reproduce the music content or effect tone content. The client terminal may select appropriate music content or effect tone content from a memory of the client terminal and associate the thus-selected appropriate music content or effect tone content with the visual content received from the server.

21 Claims, 7 Drawing Sheets

U.S. PATENT DOCUMENTS 5,957,696 A * 9/1999 Kageyama .............. 434/307 A
6,334,104 B1 12/2001 Hirai
6,450,888 B1 * 9/2002 Takase et al. ................. 463/43

FOREIGN PATENT DOCUMENTS

GB     2342821 A    5/2000
JP     2000-081892  3/2000

OTHER PUBLICATIONS

Realization of Sound-scape Agent by the Fusion of Conceptual Fuzzy Sets and Ontology, Takagi, Tomohiro, et al., 1999 IEEE International Fuzzy Systems Conference Proceedings, Aug. 22025, 1999, Seoul, Korea.

* cited by examiner

APPARATUS AND METHOD FOR ADDING MUSIC CONTENT TO VISUAL CONTENT DELIVERED VIA COMMUNICATION NETWORK

BACKGROUND OF THE INVENTION

The present invention relates generally to apparatus, methods, computer programs and storage media for communicating (transmitting/receiving) desired content information, such as textual information like novels, newspaper articles and magazine articles, image information like comics and picture magazines and musical tones, between individual apparatus via a wired or wireless communication network such as the Internet. Particularly, the present invention relates to an improved apparatus, method, computer program and storage medium which are arranged to, in a case where a user desires to acquire content information such as a novel or comic, appropriately select tones of background music (BGM), effect tones, etc. matching atmosphere of individual scenes of the novel or comic and deliver the novel or comic with the thus-selected tones to the apparatus of the user, to thereby allow the user to enjoy the novel, comic or the like while listening to the tones corresponding to the substance or scenes of the novel, comic or the like.

Today, with rapid development of wired and wireless communication networks typified by the Internet, any interested person can freely read a desired novel, newspaper, magazine or the like or view a desired comic, picture magazine or the like at any desired time and in any desired place, using a mobile or cellular phone, portable communication terminal, personal computer or other communication equipment. For example, with a portable communication terminal arranged to allow a user to read a given newspaper, the user accesses a newspaper (news) distributing Web site included in a predetermined server on a communication network such as the Internet and transmits various search conditions (e.g., those pertaining to economic news) to the server, in response to which newspaper articles (pieces of news) searched for in the server are delivered to the user's portable communication terminal. Then, the newspaper articles (news) are received by the portable communication terminal and visually displayed on a predetermined display of the communication terminal, so that the user can read the newspaper articles (news) using the communication terminal. Similarly, using a mobile or cellar phone or personal computer, the user can read a desired novel, newspaper or magazine or view a desired comic, picture magazine or the like. In such cases, if the whole of a desired novel, newspaper, magazine, comic, picture magazine or the like delivered from the server is installed in the cellar phone, portable communication terminal or personal computer at the time of the first access to the Web site, then the user can read the desired novel, newspaper or magazine or view the desired comic, picture magazine or the like only via the cellar phone, portable communication terminal or personal computer, without having to again access the server via the communication network.

Heretofore, however, desired content, such as a novel, newspaper, magazine, comic or picture magazine, is displayed, on a predetermined display screen of the cellar phone, portable communication terminal, personal computer or the like, merely in text and/or image form; thus, the displayed content tends to be unattractive and very boring to the user. Therefore, there has recently emerged a more sophisticated technique, in accordance with which sound data corresponding to the textual and/or image data are delivered simultaneously with the textual and/or image data so that sounds can be generated in accordance with the textual and/or image data displayed on the screen. However, in the prior art, the sound data to be delivered simultaneously with the textual and/or image data are a long series of data created in such a way as to correspond to the textual and/or image data throughout the entire length thereof (i.e., from the beginning to end of the textual and/or image data); therefore, it would take an enormous amount of time to create the sound data and to deliver the thus-created sound data, and consequently a great storage capacity would also be required for the sound data.

SUMMARY OF THE INVENTION

In view of the foregoing, it is an object of the present invention to provide an apparatus, method and storage medium which automatically select tone data of BGM tones, effect tones and/or the like matching atmosphere of specific substance or individual scenes of a novel, comic or the like to be delivered and associate the tone data with predetermined portions of textual and/or image data constituting the novel, comic or the like, to thereby allow a user to enjoy the novel, comic or the like while listening to the BGM tones, effect tones and/or the like matching the atmosphere of the individual scenes.

According to an aspect of the present invention, there is provided a server apparatus capable of communicating with a client terminal via a communication network and supplying, in response to a request from the client terminal, visual content including text and/or image data to the client terminal, which comprises: a communication section connectable to a client terminal via the communication network; and a processor coupled with the communication section. In the server apparatus, the processor is adapted to: receive, via the communication section, an acquisition request for visual content from the client terminal on the communication network; retrieve, from a database, data of the visual content requested by the client terminal; determine music content or effect tone content to be imparted to the requested visual content in associated relation to specific substance of the requested visual content; retrieve data of the determined music content or effect tone content from a database; and perform control to transmit, via the communication section, the data of the visual content and the data of the music content or effect tone content, retrieved from the databases, to the client terminal on the communication network. On the basis of the data transmitted by the server apparatus, the client terminal can not only visually display the requested visual content but also audibly reproduce the music content or effect tone content.

Thus, when visual content including text and/or image data requested by a client terminal is to be transmitted from the server apparatus to the client terminal, music content or effect tone content corresponding to the requested visual content can be appropriately determined and transmitted to the client terminal. In this way, the client terminal can not only receive and visually display the visual content, but also receive and audibly reproduce the music content or effect tone content corresponding to the visual content during display of the visual content. As a consequence, a user of the client terminal can enjoy a reproduction of the visual content while listening to a reproduction of BGM music pieces (BGM tones) or effect tones matching various scenes of the visual content. In the present invention, the server apparatus need not prepare, in advance, separate music content or effect tone content for each individual visual content, which can thereby minimize the necessary time and labor for provision of the music content or effect tone content and reduce the load on a memory used.

As an example, in determining music content or effect tone content corresponding to the visual content, the processor may perform an analysis of the visual content requested by the client terminal and, on the basis of results of the analysis, select music content or effect tone content suitable for the requested visual content from among various items of music content or effect tone content contained in the databases, to thereby determine the music content or effect tone content to be imparted to the requested visual content. With this arrangement, it is possible for the server apparatus to determine music content or effect tone content suitable for desired visual content, so that a user of the client terminal can comfortably enjoy listening audible tones matching the visual content during reproduction by the client terminal.

According to another aspect of the present invention, there is provided a client terminal apparatus capable of communicating with a server apparatus via a communication network and receiving visual content including text and/or image data, which comprises: a communication section connectable to a server apparatus via the communication network; a content designating device operable for a user to designate visual content which the user desires to acquire; a display device; a tone generator; and a processor coupled with the communication section, the content designating device, the display device and the tone generator. In the present invention, the processor is adapted to: send, via the communication section, an acquisition request for the visual content, designated via the content designating device, to a server apparatus on the communication network; receive, via the communication section, data of the requested visual content transmitted by the server apparatus on the communication network in response to the acquisition request, wherein the server apparatus determines music content or effect tone content to be imparted to the requested visual content in associated relation to specific substance of the requested visual content, and transmits data of the requested visual content, along with data of the determined music content or effect tone content, to the client terminal apparatus via the communication network, the processor also receiving, via the communication section, the data of the music content or effect tone content; and on the basis of the data received from the server apparatus via the communication section, cause the display device to display the visual content and cause the tone generator to audibly reproduce the music content or effect tone content.

According to still another aspect of the present invention, there is provided a client terminal apparatus capable of communicating with a server apparatus via a communication network and receiving content including at least text and/or image data, which comprises: a communication section connectable to a server apparatus via the communication network; a content designating device operable for a user to designate content including at least text and/or image data which the user desires to acquire; a memory storing a plurality of items of music content or effect tone content; a display device; a tone generator; and a processor coupled with the communication section, the content designating device, the display device and the tone generator. In the present invention, the processor is adapted to: send, via the communication section, an acquisition request for the content, designated via the content designating device, to a server apparatus on the communication network; receive, via the communication section, data of the requested content transmitted by the server apparatus on the communication network in response to the acquisition request; select data of music content or effect tone content to be read out from the memory; and cause said display device, on the basis of the data received from the server apparatus via said communication section, to display the content including at least text and/or image data and cause said tone generator to audibly reproduce the selected music content or effect tone content.

The invention arranged in the above-described manner permits selection of an appropriate item of music content or tone effect content from among various items of music content or tone effect content stored in the memory of the client terminal. Thus, if the selection, from the memory, of music content or tone effect content is made by a user of the client terminal, it is possible to generate a BGM music piece (BGM tones) or effect tones fitting a user's taste and intention. Further, even where the selection, from the memory, of music content or tone effect content is made on the basis of an analysis process or the like performed by the client terminal, it is possible to eliminate the need for receiving real-time delivery, from the server apparatus, of the music content or tone effect content.

According to still another aspect of the present invention, there is provided a client terminal apparatus capable of communicating with a server apparatus via a communication network and receiving content including at least text and/or image data, which comprises: a communication section connectable to a server apparatus via the communication network; a content designating device operable for a user to designate content including at least text and/or image data which the user desires to acquire; a supply section that supplies music content or effect tone content; a display device; a tone generator; and a processor coupled with the communication section, the supply section, the content designating device, the display device and the tone generator. In the invention, the processor is adapted to: send, via the communication section, an acquisition request for the content, designated via the content designating device, to a server apparatus on the communication network; receive, via the communication section, data of the content transmitted by the server apparatus on the communication network in response to the acquisition request; cause the supply section to supply music content or effect tone content corresponding to the content received from the server apparatus via the communication section; cause the display device to progressively display the received content, a predetermined partial range of the content at a time; and cause the tone generator to audibly reproduce the music content or effect tone content supplied by the supply section while simultaneously controlling a reproduced range of the music content or effect tone content in accordance with a change in the partial range of the content being displayed by the display device.

With the present invention arranged in the above-described manner, in response to a change (e.g., screen change or screen scroll) in the visual content being displayed by the display device of the client terminal apparatus, the BGM or effect tones can be caused to change, so that enhanced reality can be attained.

The present invention may be constructed and implemented not only as the apparatus invention as discussed above but also as a method invention. Also, the present invention may be arranged and implemented as a software program for execution by a processor such as a computer or DSP, as well as a storage medium storing such a program. Further, the processor used in the present invention may comprise a dedicated processor with dedicated logic built in hardware, not to mention a computer or other general-purpose type processor capable of running a desired software program.

While the embodiments to be described hereinbelow represent the preferred form of the present invention, it is to be understood that various modifications will occur to those skilled in the art without departing from the spirit of the invention. The scope of the present invention is therefore to be determined solely by the appended claims.

BRIEF DESCRIPTION OF THE DRAWINGS

For better understanding of the object and other features of the present invention, its embodiments will be described in greater detail hereinbelow with reference to the accompanying drawings, in which.

DETAILED DESCRIPTION OF EMBODIMENTS

Figure 1:
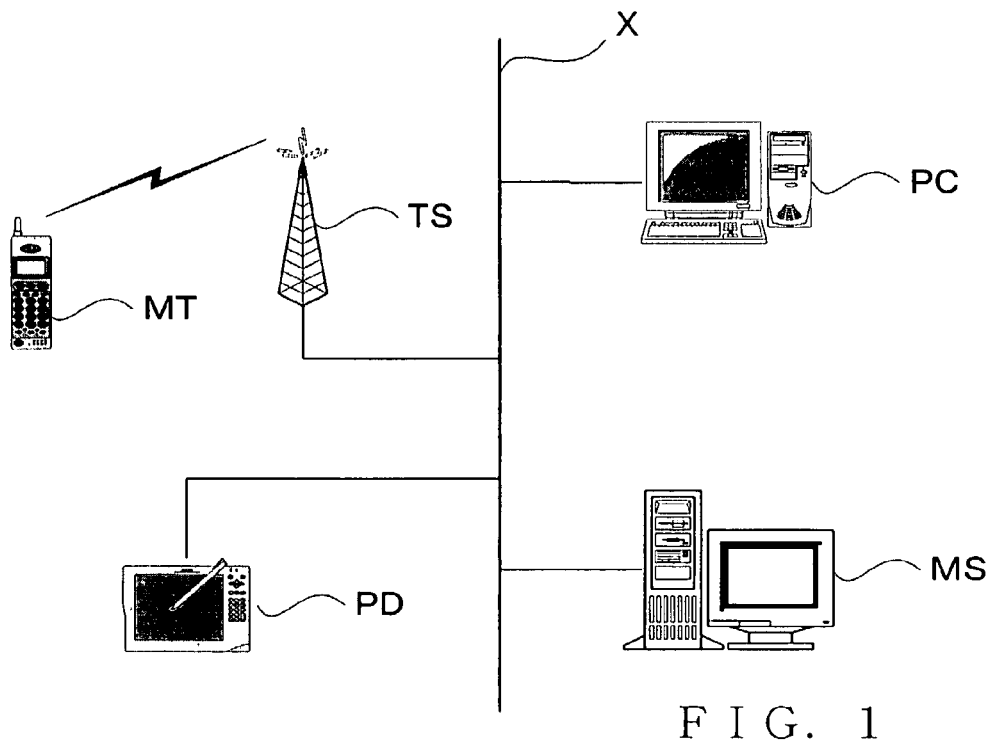
FIG. 1 is a block diagram showing an exemplary general setup of an information communication (transmission/reception) system employing an information communication apparatus in accordance with an embodiment of the present invention.

FIG. 1 is a system block diagram showing an exemplary general setup of an information communication system in accordance with an embodiment of the present invention. This information communication system generally comprises client terminals such as a personal computer PC, mobile or cellular phone MT and portable communication terminal PD such as a PDA (Portable Data (Digital) Assistance), an information distributing server MS storing various Web sites, a relay station TS, and a communication network X. As will be later described in detail, each of the above-mentioned information communication apparatus constituting the information communication system, such as the personal computer PC, mobile or cellular phone MT and portable communication terminal PD and information distributing server MS, comprises an independent computer including a CPU, ROM, RAM, communication interface, etc. Thus, the information communication apparatus in the system can communicate content data with each other via the wired or wireless communication network X such as the Internet, dedicated line or the like; in this embodiment, the content data to be communicated include text data of a novel, text and image data of a comic, music piece data constituting BGM tones and effect tones. Although the information communication system of the present invention may include other hardware than the above-mentioned, it will be described hereinafter only in relation to a case where minimum necessary resources are employed.

Each of the client terminals, such as the personal computer PC and cellular phone MT and portable communication terminal PD (hereinafter called portable client terminals), can access any one of the Web sites present in the information distributing server MS connected to the communication network X such as the Internet, by specifying a URL (Uniform Resource Locator) that is a network address made up of a train of characters. Namely, the information distributing server MS and client terminals are interconnected via any one of various communication networks X, such as a LAN (Local Area Network), Internet and telephone line network. By thus being connected to the communication network X, the client terminal can execute bidirectional communication with the information distributing server MS. Further, by accessing a user-desired Web site in response to the URL entered by the user, the client terminal can acquire user-desired content from the accessed Web site. Particularly, in the embodiment of the information communication system, the client terminal can acquire, from the accessed Web site, content, such as a novel, comic, music piece and/or the like, that corresponds to predetermined search conditions In addition, each of the client terminals can acquire, from the information distributing server MS, application programs to carry out various processes, such as one for visually displaying the contents (hereinafter, the term "substance" is used in place of the term "contents" to clearly distinguish from "content" information to be communicated) of a novel, comic or the like on the basis of the text and/or image data and one for generating BGM tones and/or effect tones on the basis of music piece data acquired from the server MS. Communication of such various information between the client terminal and information distributing server MS is executed using a predetermined software program such as an Internet browser.

Each of the portable client terminals, such as the cellular phone MT and portable communication terminal PD (e.g., PDA), is a small-sized terminal capable of wired or wireless communication and has, in addition to the primary communication function, a Web site display function. Namely, each of the portable client terminals is provided with a predetermined display device capable of displaying Web sites present in the information distributing server MS, and such a display device can also display the substance of a user-desired novel, comic or the like acquired from the information distributing server MS. Further, each of the portable client terminals can audibly generate or sound BGM music pieces and/or effect tones acquired from the information distributing server MS. When bidirectional communication is to be performed by connecting the cellular cellular phone MT to the information distributing server MS, the relay station TS intervenes. The relay station TS relays transmission/reception of various information between the cellular phone MT and the distributing server MS; that is, the cellular phone MT can access the information distributing server MS through the intervention of the relay station TS.

The information distributing server MS is a server computer having stored therein a great number of HTML (Hyper Text Markup Language) programs, content data, etc. pertaining to Web sites for presenting various information etc. to the client terminals, which, in response to an access request from any one of the client terminals, transmits to the client terminal an HTML program, content data, etc. corresponding to the request. Namely, the information distributing server MS is connected with the client terminals via the communication network X such as the Internet or dedicated line, and, in response to an access (e.g., designation of a URL) from any one of the client terminals, delivers an HTML program pertaining to a requested Web site to the client terminal. Also, in response to designation of desired content, the information distributing server MS delivers data of the desired content to the client terminal.

Note that the client terminals in the information communication system of FIG. 1 may be of any types of equipment, without being limited to the above-described personal computer PC and cellular phone MT and portable communication terminal PD, as long as they are constructed to acquire various information from the information distributing server MS via the communication network X. Further, a plurality of the information distributing server MS as well as plurality of the client terminals may of course be connected to the communication network X; namely, a number of the personal computers PC, cellular phones MT, portable communication terminals PD, information distributing server MS and relay stations TS may be connected to the communication network X. In addition to the above apparatus, other apparatus, such as a billing processing server, may be connected to the communication network X; in this case, once one of the servers has delivered information to any one of the client terminals in response to a request from the client terminal, the billing processing server may bill the client terminal for the information in accordance with the number of times of information deliveries and data quantity distributed. Further, in such a case, various options or choices for the way of payment, such as payment by cash, credit card and prepaid card, may be displayed so that the user can select a desired one of the ways of payment. Of course, an actual settlement process is not performed by the billing processing server itself, but performed by the billing processing server sending necessary billing- and payment-related information to a predetermined processor managed by a credit company or bank.

Figure 2:
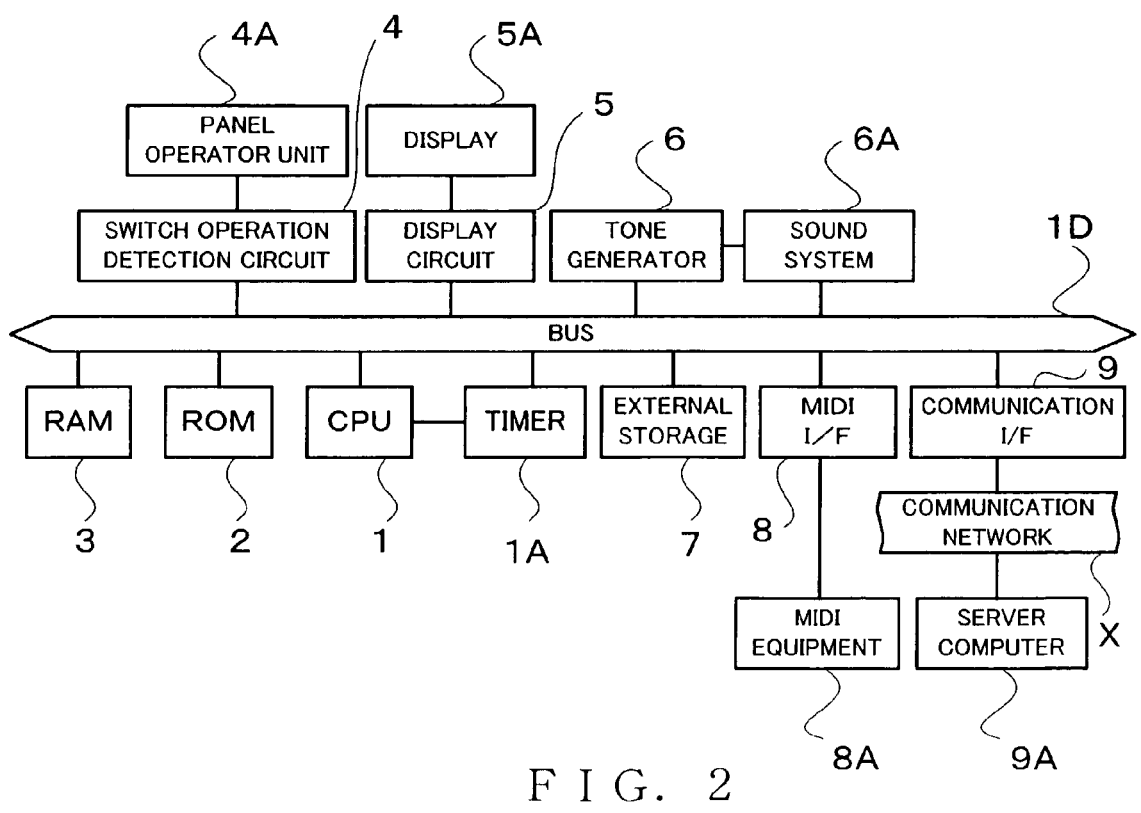
FIG. 2 is a block diagram showing an exemplary hardware setup of any one of a personal computer terminal, portable communication terminal and information distributing server shown in FIG. 1 which are similar in construction.

As noted earlier, the hardware of the personal computer terminal PC, portable communication terminal PD and information distributing server MS are constructed similarly to each other, and thus the hardware setup of just one of the personal computer terminal PC, portable communication terminal PD and information distributing server MS will hereinafter be outlined representatively with reference to FIG. 2. Specifically, FIG. 2 is a block diagram showing an exemplary hardware setup of the personal computer terminal PC.

The personal computer terminal PC in the embodiment of the information communication system is controlled by a microcomputer comprising a microprocessor unit (CPU) 1, a read-only memory (ROM) 2 and a random-access memory (RAM) 3. The CPU 1 controls all operations of the entire personal computer terminal PC. To the CPU 1 are connected, via a data and address bus 1D, the ROM 2, RAM 3, switch operation detection circuit 4, display circuit 5, tone generator circuit 6, external storage device 7, MIDI interface (I/F) 8 and communication interface (I/F) 9. Also connected to the CPU 1 is a timer 1A for counting various time periods, for example, to signal interrupt timing for timer interrupt processing. Namely, the timer 1A generates tempo clock pulses for counting time intervals or setting a performance tempo with which an automatic performance is to be executed. The frequency of the tempo clock pulses is adjustable, for example, via a tempo setting switch on a panel operator unit 4A. Such tempo clock pulses generated by the timer 1A are given to the CPU 1 as processing timing instructions or as interrupt instructions. The CPU 1 carries out various processes in accordance with such instructions from the timer 1A.

The ROM 2 has prestored therein various programs to be executed by the CPU 1 and various data to be referred to by the CPU 1. The RAM 3 is used as a working memory for temporarily storing automatic performance information to be used for executing an automatic performance, various data generated as the CPU 1 executes the programs. The RAM 3 is also used as a memory for storing the currently-executed program and data related thereto. Predetermined address regions of the RAM 3 are allocated to various functions and used as registers, flags, tables, memories, etc. The panel operator unit 4A includes various switches and operators to be used by the user to enter a URL, content search conditions, various performance conditions for automatically performing a music piece, etc. The operator unit 4A may also include various other operators, such as a ten-button keypad for manual entry of numeric value data and a keyboard for manual entry of text data, which are intended to select, set and control a tone pitch, color, effect, etc. The switch operation detection circuit 4 constantly detects respective operational states of the individual operators on the panel operator unit 4A and outputs switch information, corresponding to the detected operational states of the operators, to the CPU 1 via the data and address bus 1D. The display circuit 5 visually displays various information, such as a Web site screen and content of a novel or comic, on a display device 5A that may comprise an LCD (Liquid Crystal Display) or CRT (Cathode Ray Tube). In addition, the display circuit 5 displays, on the display device 5A, various information related to an automatic performance of a music piece, controlling state of the CPU 1, etc.

The tone generator (T.G.) circuit 6, which is capable of simultaneously generating a plurality of tone signals in a plurality of channels, receives tone data supplied via the data and address bus 1D and generates tone signals based on the received tone data. Each of the tone signals thus generated by the tone generator circuit 6 is audibly reproduced or sounded by a sound system 6A including amplifiers and speakers. The tone signals thus generated by the tone generator circuit 6 may be imparted with desired effects by an effect circuit (not shown). The tone data to be received via the data and address bus 1D may be either in a digitally-encoded format such as the MIDI format or in a waveform sample data format such as the PCM, DPCM or ADPCM. The tone generator circuit 6 may be constructed in any desired conventional manner; for example, it may generate tone signals by any one of tone synthesis methods, such as the FM, PCM, physical model, formant synthesis methods. Further, the tone generator circuit 6 may be implemented by dedicated hardware or software processing performed by the CPU 1.

The external storage device 7 is provided for storing text and/or image data constituting individual items of content (generically called "text/image content"), tone data (tone content), other data such as those pertaining to control of various programs to be executed by the CPU 1, etc. Where a particular control program is not prestored in the ROM 2, the control program may be prestored in the external storage device (e.g., hard disk device) 7, so that, by reading the control program from the external storage device 7 into the RAM 3, the CPU 1 is allowed to operate in exactly the same way as in the case where the particular control program is stored in the ROM 2. This arrangement greatly facilitates version upgrade of the control program, addition of a new control program, etc. The external storage device 7 may use any one or combination of various removable-type storage media other than the hard disk (HD), such as a floppy disk (FD), compact disk (CD-ROM or CD-RAM), magneto-optical disk (MO), digital versatile disk (DVD) and semiconductor memory. Note that the external storage device 7 of the information distributing server MS functions as a database having stored therein a multiplicity of items of text and image content and tone content, and the external storage device 7 of the personal computer terminal PC functions, for example, as a memory storing downloaded content.

The MIDI interface (I/F) 8 is provided for receiving and delivering MIDI tone information (MIDI data) from and to other MIDI equipment 8A or the like. Note that the other MIDI equipment 8A may be of any type (or operating type), such as the keyboard type, guitar type, wind instrument type, percussion instrument type or gesture type, as long as it can generate MIDI data in response to manipulations by the user or player.

Note that the MIDI interface 8 may be a general-purpose interface rather than a dedicated MIDI interface, such as RS232-C, USB (Universal Serial Bus) or IEEE1394, in which case other data than MIDI event data may be communicated at the same time. In the case where such a general-purpose interface as noted above is used as the MIDI interface 8, the other MIDI equipment 8A may be designed to communicate other data than MIDI event data. Of course, the musical information handled in the embodiment may be of any other data format than the MIDI format, in which case the MIDI interface 8 and other MIDI equipment 8A are constructed in conformity to the data format used.

Further, the communication interface 9 is connected to the communication network X, such as a LAN (Local Area Network), the Internet or telephone line network, via which it can be connected to the predetermined information distributing server MS (FIG. 1) or the like. Thus, the personal computer terminal PC can load, from the information distributing server MS via the communication network X, control programs for displaying a novel, comic, etc. and automatically performing a music piece, HTML program for displaying a Web site, content data such as text and/or image data and tone data. For example, in a situation where a user-desired program, such as a display control program or automatic performance control program, is not contained in the ROM 2, the external storage device (hard disk) 7 or the like of the personal computer terminal PC, the communication interface 9 can be used for downloading such a display control program, automatic performance control program or the like from the information distributing server MS. Namely, the client terminal (in this case, personal computer terminal PC) sends a command to request the information distributing server MS to download the desired HTML program, content data, etc. by way of the communication interface 9 and communication network X. In response to the command from the personal computer terminal PC, the information distributing server MS delivers the requested HTML program, content data, etc. to the personal computer terminal PC via the communication network X. Then, the personal computer terminal PC receives the HTML program, content data, etc. so as to display, on the display device 5A, a Web site on the basis of the HTML program and the content data, or accumulatively store them into the external storage device (hard disk) 7 or the like.

It should be appreciated that the communication interface 9 and communication network X may be of either or both of wired and wireless types.

Note that the information distributing server MS need not necessarily include some of the above-described hardware components, such as the MIDI interface 8, tone generator circuit 6 and sound system 6A.

Further, the personal computer terminal PC and portable communication terminal PD are each not limited to the type where the panel operator unit 4A, display device 5A, tone generator circuit 6, etc. are incorporated together within the body of the terminal, and may be of another type where the panel operator unit 4A, display device 5A, tone generator circuit 6, etc. are provided separately from each other but can be connected with each other via MIDI interfaces and communication facilities such as a communication network. Further, the personal computer terminal PC may be other than a personal computer itself, such as an automatic performance apparatus like a karaoke apparatus or player piano, game apparatus or electronic musical instrument.

Figure 3:
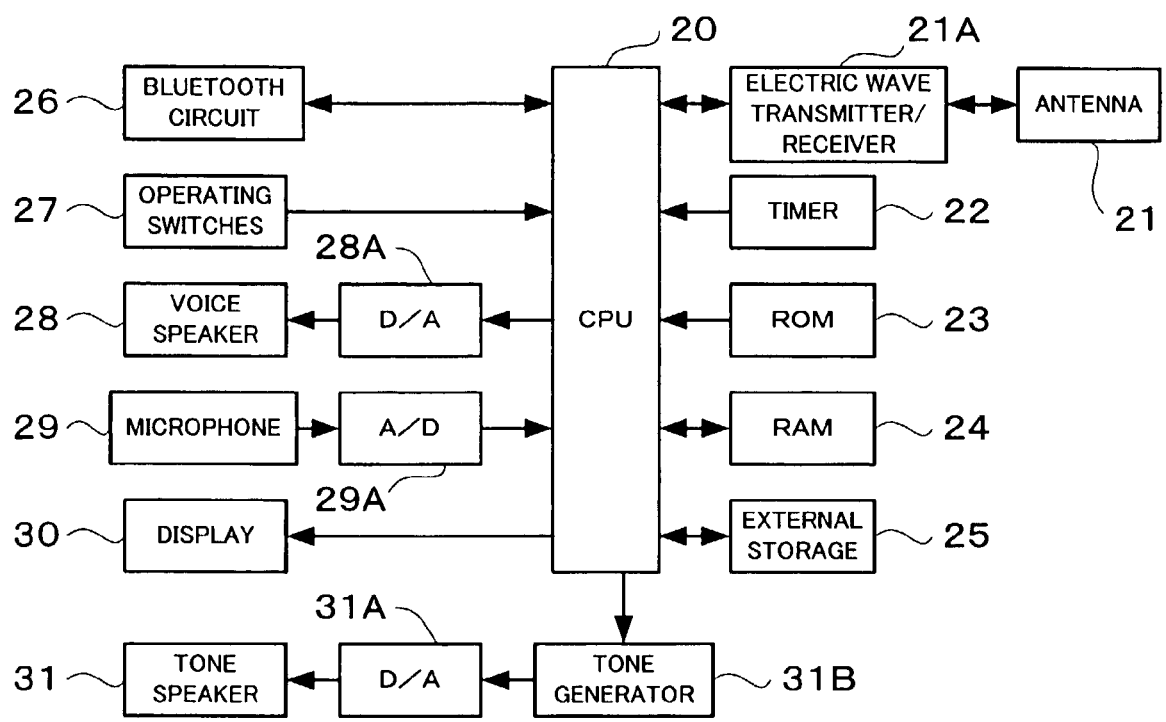
FIG. 3 is a block diagram showing an example of a hardware setup of a mobile or cellular phone shown in FIG. 1.

The following paragraphs describe an exemplary hardware setup of the cellular phone MT of FIG. 1, with reference to FIG. 3 which is a block diagram showing an example of the hardware setup of the cellular phone MT. The cellular phone MT in the instant embodiment is controlled by a microcomputer comprising a CPU 20, ROM 23 and RAM 24. Timer 22, ROM 23 and RAM 24 connected to the CPU 20 operate in the same manner to the timer 1A, ROM 2 and RAM 3 having been described above in relation to the personal computer terminal PC, and thus will not be described in detail here. To the CPU 20 are connected, in addition to the timer 22, ROM 23 and RAM 24, a radio or electric wave transmitter/receiver 21A, external storage device 25, bluetooth circuit 26, operating switches 27, voice speaker 28, microphone 29, display device 30, tone generator 31B, etc.

The cellular phone MT in the instant embodiment includes the electric wave transmitter/receiver 21A and bluetooth circuit 26 as communication input/output interfaces. The electric wave transmitter/receiver 21A operates to transmit and receive information to and from the relay station TS (FIG. 1) through wireless communication via an antenna 21. Namely, this electric wave transmitter/receiver 21A permits communication of various information between the cellular phone MT and the information distributing server MS (FIG. 1). The bluetooth circuit 26 is a conventional interface for short-distance wireless communication, which can communicate information, such as content data of a novel, comic or music piece, with other equipment having a similar bluetooth circuit. Needless to say, the cellular phone MT may include input/output interfaces for wired communication in addition to such input/output interfaces for wireless communication. The external storage device 25 may be either incorporated in the body of the cellular phone MT or connected to external equipment via a cable or the like. In the case where the external storage device 25 is incorporated in the body of the cellular phone MT, it is preferable that the device 25 be a compact semiconductor memory (e.g, flash memory). In the case where the external storage device 25 is connected to external equipment, it may be any one of a hard disk (HD), floppy disk (FD), compact disk (CD-ROM or CD-RAM), magneto-optical disk (MO), digital versatile disk (DVD) and the like, similarly to the external storage device 7. Content of a novel, comic, music piece or the like (specifically, data of the content) is stored, for example, in a flash memory and then read out from the flash memory to be processed for analysis of text data, as will be later described. The operating switches 27, including numeral entering switches, are provided on or incorporated in the body of the cellular phone MT.

The voice speaker 28 is a speaker dedicated to production of voices of another party during a telephone conversation; the voice speaker 28 produces voices in accordance with analog signals converted from digital signals by a D/A converter 28A. Namely, voice signals of the other party received by the electric wave transmitter/receiver 21A are converted by the D/A converter 28A and then passed to the voice speaker 28 for audible production of the voices so that the user of the cellular phone MT can hear and identify speeches of the other party. The microphone 29 is a sound input device which picks up voices and converts the voices into voice signals represented by electric current or voltage levels. A/D converter 29A converts input analog signals into digital signals. The display device 30 is, for example, in the form of a liquid crystal display device (LCD) that is provided on or incorporated in the body of the cellular phone MT. The tone generator 31B generates tone signals on the basis of tone data received via the electric wave transmitter/receiver 21A or bluetooth circuit 26 or tone data read out from the external storage device 25, and the thus-generated tone signals are audibly reproduced or sounded via a D/A converter 31A and tone speaker 31. In this way, the cellular phone MT can sound BGM music piece and/or effect tones in accordance with tone data received from the information distributing server MS. The tone generator 31B of the cellular phone MT may be constructed in a similar manner to the tone generator 6 of the personal computer terminal PC.

Figures 4A, 4B:
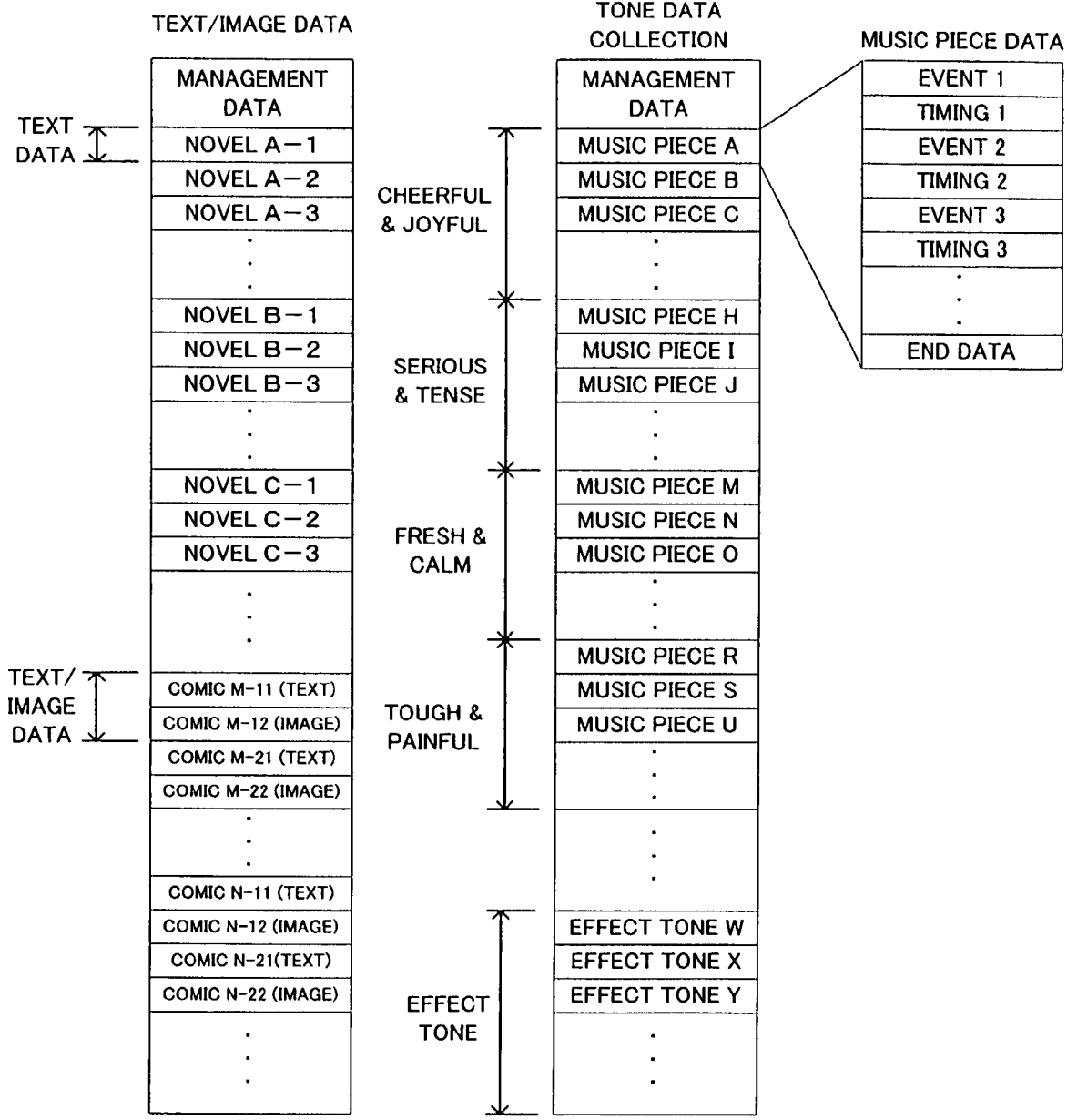
FIGS. 4A and 4B are diagrams schematically showing an exemplary storage format of content data.

Here, with reference to FIGS. 4A and 4B, a description will be made about organizations of various content data, such as those of a novel, comic, BGM tones and effect tones, that are communicated between any one of the client terminals and the information distributing server MS, namely, text data constituting a novel, text and/image data of a comic and tone data of a music piece and effect tones. FIGS. 4A and 4B are diagrams schematically showing an exemplary storage format of such content data; for convenience of illustration, FIGS. 4A and 4B illustrate a plurality of different sets of content data as stored in succession, although the different sets of content data may of course be stored dispersedly as in the well-known memory management schemes.

First, a description is made about the text data and text/image data (i.e., text/image content) shown in FIG. 4A. The text data and text/image data (i.e., text/image content) include management data, sets of text data representative of individual novels, and sets of text/image data of representative individual comics. The text data sets of the individual novels and the text/image data sets of the individual comics are managed by the management data; namely, the management data are intended to manage an overall data organization of the text data and text/image data. The text data set of each of the novels comprises data of a plurality of characters for displaying sentences of the novel on the display device 5A; namely, the text data set represents trains of characters constituting the novel. If the text data set of each or any one of the novels (in the illustrated example, novel A, novel B and novel C) has a great data quantity, the text data set is stored in predetermined divided data units or sections (i.e., predetermined data divisions). In the illustrated example, the text data set of novel A is stored in three divided data sections ("novel A-1", "novel A-2" and "novel A-3"). Here, each of the divided data sections corresponds to a quantity or unit of data that can be communication (transmitted or received), per communication, between the client terminal and the information distributing server MS. The data sets stored in the divided data sections are imparted with respective division numbers so that the individual data sets can be read out by designation of the corresponding data section (division) numbers.

The text/image data set of each of the comics, on the other hand, comprises image data for displaying frames of the comic on the display device 5A, and text data for displaying words and background sounds of the comic on the display device 5A. The text and image data sets of each of the comics are stored in combinations corresponding to the frames of the comic. Similarly to the text data of the novels, the text/image data set of each or any one of the comics (in the illustrated example, comic M and comic N) has a great data quantity, the text/image data set is stored in divided data sections. In the illustrated example, the text/image data set of comic M is stored in two divided data sections ("comic M-11" (text data) and "comic M-12" (image data), and comic M-21" (text data) and "comic M-22" (image data)).

Next, a description is made about the tone data shown in FIG. 4B. The tone data comprise management data, a plurality of sets of music piece data representative of music pieces, and a plurality of sets of music piece data representative of effect tones. The sets of music piece data stored here are classified according to atmosphere of individual scenes, such as "cheerful and joyful", "serious and tense", "fresh and calm" and "tough and painful", as well as types of effect tones. For example, a music piece data set representative of a "bright" melody may be classified as the "cheerful and joyful" atmosphere. The classification of such music piece data sets into the individual atmosphere is managed by the management data. Namely, the management data is intended to manage an overall data organization of the tone data. In the instant embodiment, each of the sets of the music piece data, representative of "music piece A, music piece B, . . . , effect tone Y", is added to the content data of the corresponding novel or comic, and is used as tone generation control information for automatically generating a music piece (or effect tone) matching the atmosphere of a scene of the novel or comic. Each of the sets of the music piece data generally comprises event data (event 1, event 2, . . . ), timing data (timing 1, timing 2, . . . ) and end data. The event data (event 1, event 2, . . . ) comprise performance event data representative of note-related events such as note-on and note-off events, program change data for switching tone colors, etc. The timing data (timing 1, timing 2, . . . ) are each data that represents event data occurrence timing in an absolute time from the beginning of the music piece in question or in a relative time from the preceding note event data. Thus, in a music piece performance or the like, absolute performance timing from the beginning of the music piece or relative performance timing between adjacent notes can be determined, and the performance is carried out on the basis of the thus-determined performance timing. The end data indicates the end of the music piece data set. Namely, in the illustrated example where a multiplicity of the music piece data sets of different music pieces are stored in succession, the end data indicate the respective ends of the music piece data sets.

Whereas the music piece data are preferably in the SMF (Standard MIDI file) format, they may of course be in any other suitable format than the SMF format, such as one where notes are encoded in specific form. Further, the music piece data may be tone sample data rather than the data obtained by encoding notes such as MIDI data, in which case it is preferable that a data compression format, such as the MP3 format, be used instead of using the PCM data as they are.

Each of the client terminals shown in FIG. 1 selects a desired item of content of a novel, comic, music piece or the like and acquires the selected content from the information distributing server MS. Namely, in response to a request given from any one of the client terminals, the information distributing server MS delivers the selected content of the novel, comic or music piece to the client terminal. Such acquisition and delivery processes of the selected content are carried out by the respective CPUs 1 of the client terminal and server MS executing predetermined programs (computer software). Of course, the acquisition and delivery processes may be implemented by microprograms executed via DSPs (Digital Signal Processors), rather than by the computer software. Further, the acquisition and delivery processes may be implemented by dedicated hardware apparatus including discrete circuits, integrated or large-scale integrated circuit, gate arrays and/or the like, instead of such software programs.

Figure 5:
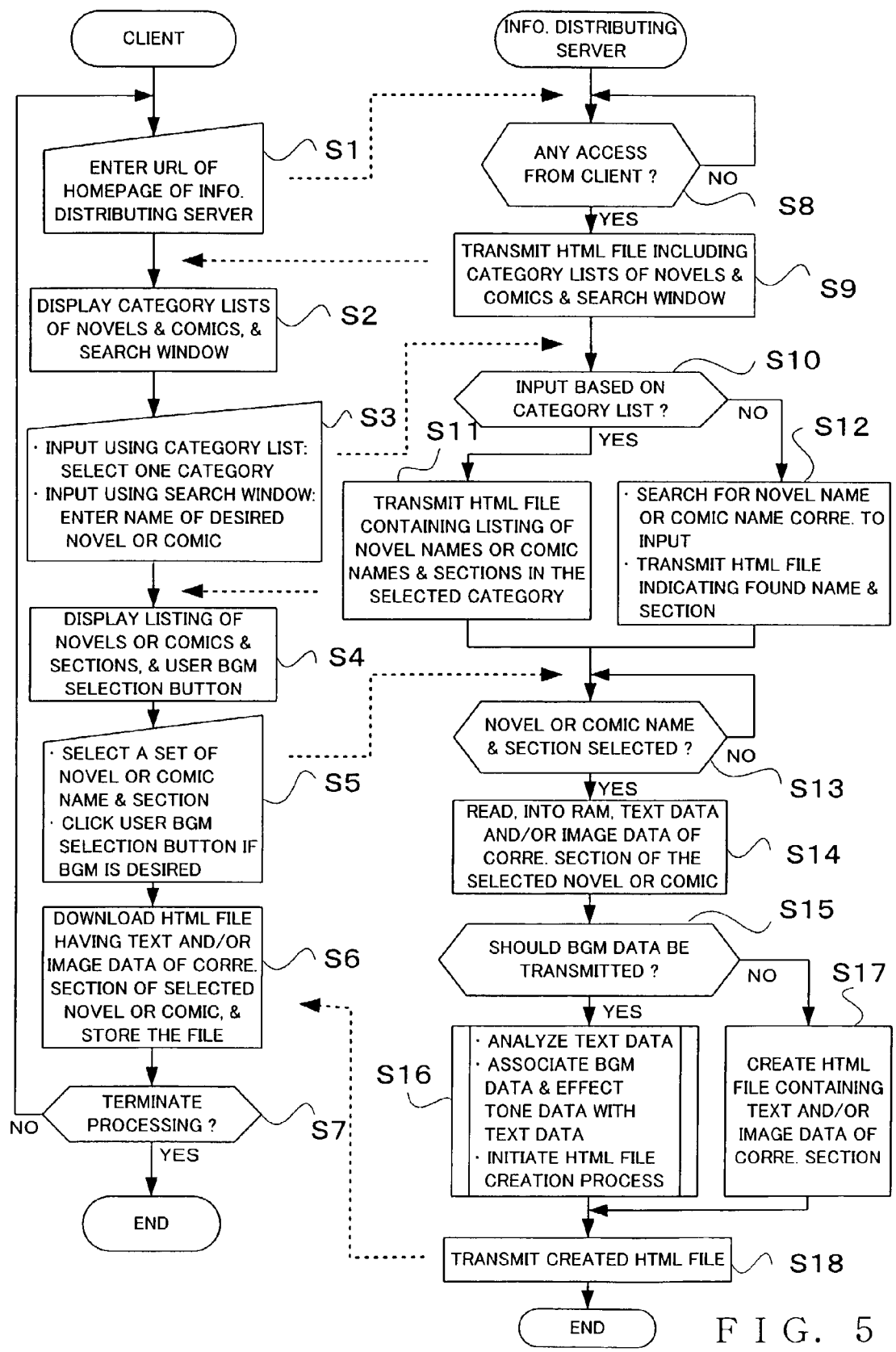
FIG. 5 is a flow chart showing an example of main processing executed by a client terminal and information distributing server in the embodiment of FIG. 1.

The following paragraphs describe "main processing" for downloading desired content from the information distributing server MS to any one of the client terminals, with reference to FIG. 5. FIG. 5 is a flow chart showing an example of the main processing executed by the client terminal and information distributing server MS in the embodiment of FIG. 1. The main processing is carried out by any one of the client terminals, such as the personal computer terminal PC, cellular phone MT and portable communication terminal PD, and the information distributing server MS, in order to search a desired Web site, select desired content, download the desired content, etc.

At step S1, the client terminal is connected to the communication network X, so that, in accordance with the URL of a user-desired home page entered via the client terminal, access is made to a predetermined one of information distributing servers MS (e.g., electronic book distributing site) including that home page. Each of the servers MS on the communication network X constantly determines at step S8 whether there has been any access from any one of the client terminals. If there has been no access from the client terminals (NO determination at step S8), the information distributing server MS repeats the operation of step S8 until an affirmative or YES determination is made at step S8. If, on the other hand, there has been any access from any one of the client terminals (YES determination at step S8), the server MS transmits, to the client terminal, an HTML file including category lists of novels and comics and a search window, at step S9. Namely, of the plurality of servers MS connected to the communication network X, only one server MS including the Web site corresponding to the entered URL is accessed by the client terminal, and transmits the HTML file to the client terminal; the other servers each wait until there has been made any access thereto by any one of the client terminals.

Once the client terminal receives the HTML file including the category lists of novels and comics and the search window, it displays the category lists of novels and comics and the search window on the display device 5A on the basis of the received HTML file, at step S2. For example, the category list of novels contains novel categories such as "love story", "detective story" and "historical story", and the category list of comics contains comic categories such as "sports comic", "gag comic" and "four-frame comic". The display based on such an HTML file may be by a well-known technique and hence will not be described here. At next step S3, the client terminal sends, to the server MS, a desired category entered by the user on the basis of the category lists or on the basis of the search window; specifically, the user personally enters the desired category by selecting one of the categories indicated in the category lists or by inputting a specific name of a desired novel or comic to the search window. Then, at step S10, the server MS determines whether the category entered via the client terminal is one selected using the category list. If the category has been selected using the category list as determined at step S10 (YES determination at step S10), then the server MS transmits, to the client terminal, an HTML file containing a listing of novel names or comic names and divided data sections included in the selected category, at step S11.

If, on the other hand, the category entered via the client terminal is not one selected using the category list, i.e. if the category entered via the client terminal is one using the search window, (NO determination at step S10), the server MS searches for the novel or comic corresponding to the novel name or comic name entered into the search window, and, if such a novel or comic has been successfully found, the server MS transmits, to the client terminal, an HTML file indicating the name of the thus-found corresponding novel or comic and divided data section thereof, at step S12. In turn, the client terminal displays, on the display device 5A, the listing of the names of the thus-found corresponding novels or comics and divided data sections (see a "listing display screen" to be later described) on the basis of the HTML file received from the server MS and a "user BGM selection" button, at step S4. If a set of the novel or comic name and divided data section number has been selected by the user from among the novel or comic names and divided data sections displayed on the display device 5A, or if the "user BGM selection" button has been clicked by the user, such input information is sent to the information distributing server MS at step S5. By the arrangement that allows the user to select novel or comic content using either the category list or the search window as desired, the user can easily select a desired novel, comic or the like through selection of a category from the category list even if the user does not clearly know the name or the like of the desired novel or comic, or, if the user clearly knows the desired novel or comic, the user can easily and promptly select a desired novel or comic through the search window; thus, this arrangement is very useful and convenient.

At step S13, the server MS makes a determination as to whether a novel or comic name and divided data section number have been selected in the client terminal, namely, whether information representative of a set of novel or comic name and divided data section number selected by the user of the client terminal (see step S5 above) has been received from the client terminal. If such a set of novel or comic name and divided data section number has not yet been selected in the client terminal and sent to the server MS (NO determination at step S13), the server MS repeats the operation of step S13 until a set of novel or comic name and divided data section number is selected in the client terminal and sent to the server MS. If, on the other hand, such a set of novel or comic name and divided data section number has been selected in the client terminal and sent to the server MS (YES determination at step S13), the server MS reads, into a predetermined area of the RAM 3, text data or text/image data corresponding to the selected novel or comic and divided data section number, at step S14. Then, at step S15, the server MS determines whether a BGM music piece should be transmitted to the client terminal. If a BGM music piece should be transmitted to the client terminal as determined at step S15, i.e. if the "user BGM selection" button has been clicked in the client terminal (see step S5 above), the server MS, at step S16, carries out an "HTML file creation process" for analyzing the text data to create a predetermined HTML file (e.g., compact HTML file) having music piece data of BGM music pieces and effect tones matching or suitable for individual data section and subsections (such as paragraphs) of the text data in corresponding relation to the section and subsections.

If, on the other hand, no BGM music piece should be transmitted to the client terminal (NO determination at step S15), i.e. the "user BGM selection" button has not been clicked in the client terminal (see step S5 above), the server MS, at step S17, creates a predetermined HTML file (e.g., compact HTML file) including only text data or text/image data corresponding to the selected data section number; in the HTML file created in this case, neither BGM music piece nor effect tones is associated with the text data for each of the data section and subsections. Then, at step S18, the server MS transmits the created predetermined HTML file to the client terminal. In turn, the client terminal receives, from the server MS, the predetermined HTML file including text data or text/image data corresponding to the data section number of the selected novel or comic and stores the received HTML file in a storage means such as the external storage device 7 (or 25), at step S6. Namely, the above operations of the client terminal constitute a download process. At next step S7, the client terminal makes a determination as to whether the main processing should be brought to an end. For example, if the user has clicked a predetermined "end" button displayed on the display device 5A, the client terminal determines that the main processing should be brought to an end (YES determination at step S7). If, on the other hand, the user has not yet clicked the predetermined "end" button, then the client terminal determines that the main processing should not be brought to an end (NO determination at step S7), and it reverts to step S1 in order to repeat the above-described operations.

Figure 6:
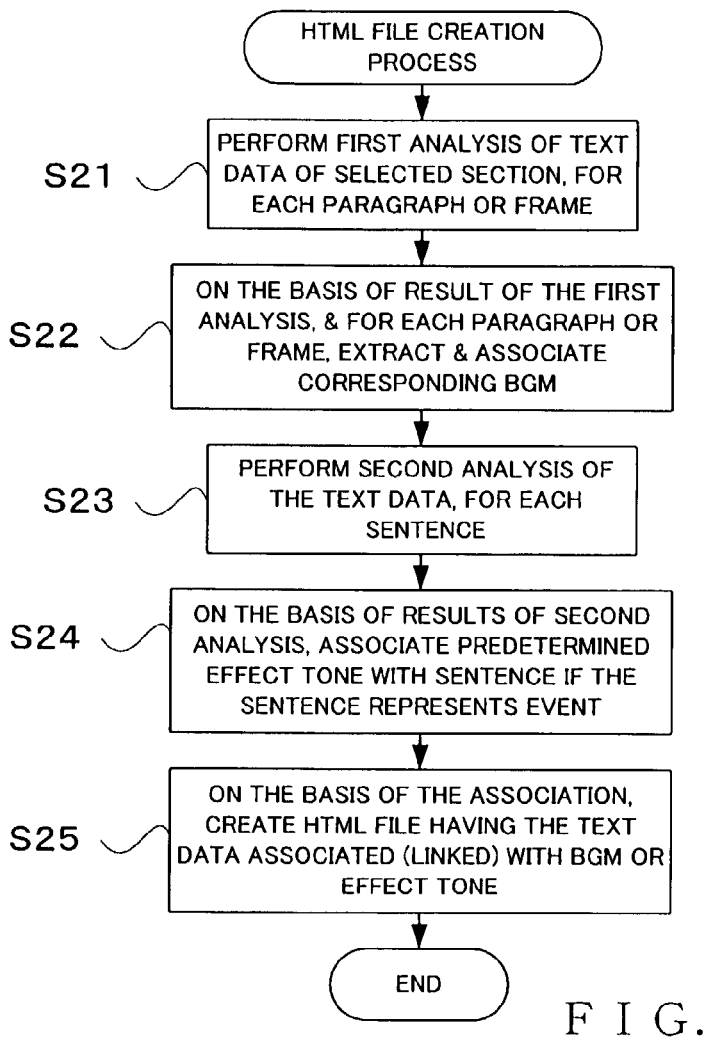
FIG. 6 is a flow chart showing an example of an "HTML file creation process" carried out by the information distributing server during the main processing of FIG. 5.

The following paragraphs describe the "HTML file creation process" carried out in the main processing by the server MS (step S16 above). FIG. 6 is a flow chart showing an exemplary step sequence of the HTML file creation process. As noted earlier, the HTML file creation process is directed to analyzing text data, corresponding to a selected data section number, to create a predetermined HTML file (e.g., compact HTML file) having music piece data of BGM music pieces and effect tones matching or suitable for individual data section and subsections of the text data in corresponding relation to the section and subsections.

First, at step S21, a first analysis is performed on a text data set corresponding to a selected data section number, for each paragraph (if the text data set is of a novel) or for each frame (if the text data set is of a comic); that is, the text data of each individual paragraph or frame contained in the text data set are subjected to this first analysis. Then, at step S22, on the basis of results of the first analysis, BGM music piece data matching or suitable for the individual paragraphs or frames are extracted and associated (stored in corresponding relation to) the paragraphs or frames of the text data set. For example, where text data representative of "laugh", "cheerful", "skip", etc. appear in the analyzed paragraph or frame more frequently than text data representative of "cry", "hateful", "painful", "fresh", etc., any one of music piece sets classified into the "cheerful and joyful" is selected from the tone data collection (see FIG. 4B) and associated with the text data. Because BGM music pieces appropriately matching the atmosphere of individual data sections and subsections of the novel or comic can be thus associated with the data sections and subsections of the novel or comic, the BGM music pieces appropriately matching specific substance or scenes of the novel or comic can be sounded when the novel or comic is reproduced by the user using the client terminal, as will be later described in detail.

At step S23, a second analysis is performed on the text data set corresponding to the selected data section number, for each sentence; that is, the text data of each sentence contained in the text data set are subjected to the second analysis. Then, on the basis of results of the second analysis, a predetermined effect tone is determined and associated with each of the sentences which is representative of a predetermined event, at step S24. Specifically, the predetermined effect tone is determined and associated here with reference to a predetermined event table (not shown) only when the table indicates that the predetermined effect tone should be imparted to the event represented by the analyzed sentence. For example, in the case where the event table indicates that predetermined effect tones should be imparted to events, such as a car crash, door closure and "being aboard an electric train", having been detected as the result of the analysis of the individual sentences of the text data set corresponding to the selected data section number, music piece data of corresponding effect tones, such as a "crash", "bang" and "clikety-clack and clang" (indicating sounds of a train running on a railroad and sounds of a crossing signal, respectively), are selected and associated with the individual sentences within the data section. Whereas only one BGM music piece is imparted to each data section at step S22, a plurality of effect tones are imparted to some of the sentences representative of predetermined events. In this manner, effect tones corresponding to specific substance or scenes of the entire novel or comic can be associated with predetermined sentences of the novel or comic, so that effect tones appropriately matching the substance of the entire novel or comic can be sounded as the novel or comic is reproduced by the user using the client terminal. Thus, such arrangements can cause the user to think of scenes full of extreme reality, as will be later described in detail. At next step S25, a predetermined HTML file (e.g., compact HTML file) is created, on the basis of the correspondency between the text data and the BGM music pieces and effect tones, which includes the text data and the music piece data of the BGM music pieces and effect tones associated (e.g., linked) with each other.

Figure 7:
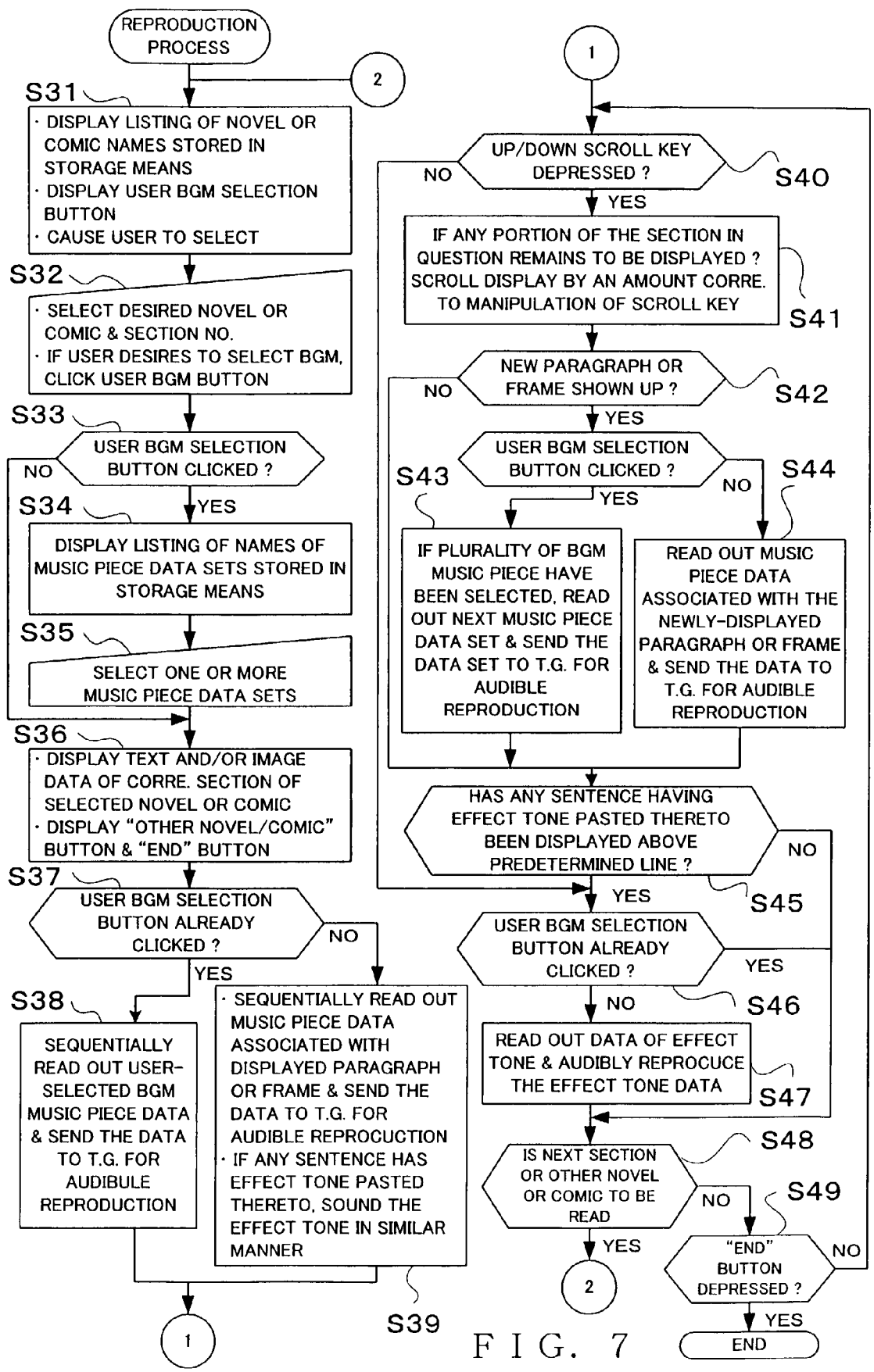
FIG. 7 is a flowchart showing an exemplary step sequence of a reproduction process carried out by the client terminal.

The predetermined HTML file having been created by the server MS such that music piece data are associated with the individual data sections or sentences in the above-described manner is transmitted to the client terminal. Then, on the basis of the HTML file received from the server MS, the client terminal not only displays the novel or comic on the display device 5A but also audibly reproduces or sounds the BGM music pieces and effect tones matching the individual scenes of the novel or comic. In this connection, the following paragraphs describe a reproduction process carried out in the client terminal on the basis of such an HTML file, with reference to FIG. 7. FIG. 7 is a flowchart showing an exemplary step sequence of the reproduction process.

In the reproduction process, the client terminal displays various screens on the display device 5A so as to prompt the user to select desired information, at step S31. Among the various screens to be on the display device 5A here are a listing of the names of novels or comics and data section numbers currently stored in the storage means, such as the external storage device 7 (or 25), of the client terminal and the "user BGM section" button (see FIG. 9 to be described later). The user uses such screen displays to select a novel or comic which he or she wants to read, at step S32. For example, the user selects the name of a desired novel or comic and corresponding data section number on the basis of the displayed listing of the names of novels or comics and data section numbers. In case the user himself (or herself) wants to select BGM music pieces to be sounded during display of the novel or comic, the user clicks the user BGM section button. Then, at step S33, a determination is made as to whether the user BGM section button has been clicked by the user. With a negative or NO determination at step S33, the client terminal jumps to step S36. If, on the other hand, the user BGM section button has been clicked by the user (YES determination at step S33), the client terminal displays, on the display device 5A, a listing of the names of music piece data sets currently stored in the external storage device 7 (or 25), at step S34. Thus, the user is allowed to select one or more desired music piece data sets in accordance with the listing displayed on the display device 5A, at step S35. At next step S36, the name of the novel or comic selected at step S32 above and the text data or text/image data corresponding to the data section of the novel or comic are displayed in a predetermined size corresponding to the display area of the display device 5A, and an "other novel/comic" button and "end" button are displayed simultaneously on a predetermined position of the display device 5A, as will be later described in detail.

Figure 8:
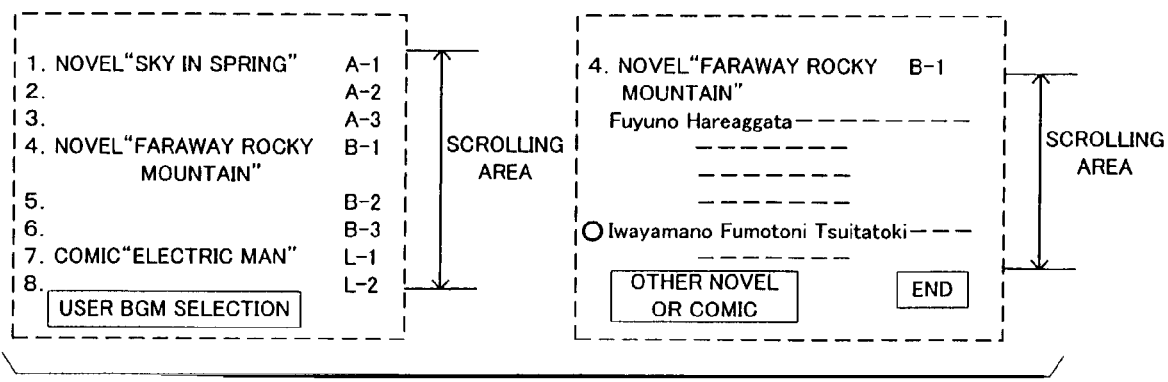
FIG. 8 is a conceptual diagram showing an example of a screen display to be presented on a display device during the reproduction process of FIG. 7.

Now, a description is given about a specific example of the various screen displays to be presented on the display device 5A in the reproduction process, with reference to FIG. 8. FIG. 8 is a conceptual diagram showing an example of a screen display to be presented on the display device 5A in the reproduction process. In FIG. 8, a specific example of the "listing display screen" (see step S31) that indicates the listing of the names of novels or comics and data section numbers and the user BGM selection button is shown on the left, while a specific example of a "section-by-section display screen" (see step S36) that indicates the text data or text/image data corresponding to the data section of the selected novel or comic is shown on the right. These screens are ones created on the basis of the predetermined HTML program transmitted from the server MS (see steps S11, S12 and S18 of FIG. 5); the HTML program intended to display such screens have been downloaded from the server MS and stored in the external storage device 7 (or 25) or the like of the client terminal.

First, the "listing display screen" (see steps S4 or S31) shown on the left of FIG. 8 is described below. This listing display screen is the first screen that is displayed in response to an instruction for initiating the above-described reproduction process.

The listing display screen is shown in FIG. 8 as displaying novel names "Sky in Spring" and "Faraway Rocky Mountain", comic name "Electric Man", data section numbers corresponding to the novel and comic names, and the user BGM selection button. The novel and comic names displayed on this listing display screen are those belonging the category selected by the user, or those selected by the user using the search window. The data section numbers displayed on this listing display screen are those corresponding to the displayed novel and comic names. These novel and comic names and data section numbers are displayed within a predetermined scrolling area. Specifically, in the illustrated example, "A-1" to "A-3" are displayed as the data section numbers corresponding to the novel name "Sky in Spring", "B-1" to "B-3" as the data section numbers corresponding to the novel name "Faraway Rocky Mountain", and "L-1" and "L-2" as the data section numbers corresponding to the comic name "Electric Man". As already set forth above, each of the data section numbers represents a predetermined quantity or unit of novel-constituting text data or comic-constituting text/image data to be communicated between the server MS and the client terminal per communication. Therefore, to download all the data of the novel "Sky in Spring" to the client terminal, at least three communications have to be carried out. Further, the display of the novel and comic names and data section numbers within the scrolling area can be scrolled vertically (in an up-and-down direction) or horizontally (in a left-and-right direction) in response to a user's scroll instruction via a predetermined scroll key. Namely, in the illustrated example, other novel and comic names and data section numbers than those currently displayed in the scrolling area can be displayed by manipulating the predetermined scroll key.

Next, the "section-by-section display screen" (see step S36) shown on the right of FIG. 8 is described below. This section-by-section display screen is intended to display the substance or details of the novel or comic based on the text data or text/image data corresponding to the data section number designated via the above-mentioned listing display screen. In FIG. 8, the section-by-section display screen is shown as indicating part of the details corresponding the data section number "B-1" of the novel "Faraway Rocky Mountain".

As illustratively shown in FIG. 8, this section-by-section display screen displays the selected novel name and data section number ("Faraway Rocky Mountain" and "B-1"), part of the text data corresponding to the data section number (in the illustrated example, "Fuyuno Hareaggata . . . IwayamanoFumotoni Tsuitatoki . . . "; these are Japanese words)), "other novel/comic" button operable for the user to select another novel or comic than that currently displayed, and "end" button. In the event that all the text data corresponding to the data section number can not be displayed at one time on the display device 5A, only a portion of the text data corresponding to the data section number are displayed within a scrolling area, so that the display of the text data can be scrolled vertically or horizontally as necessary in response to a user's scroll instruction via the scroll key. Namely, other sentences than those currently displayed in the scrolling area can be displayed by manipulating the predetermined scroll key. Further, of the sentences displayed in horizontal lines in the scrolling area, a special style of display, such as by an illuminating lamp, arrow or sign representative of a speaker (in the illustrated example, mark "○"), is applied to the beginning of the sentence for which an effect tone is to be sounded; such a special style of display indicates to the user where an effect tone is to be sounded.

Referring back to FIG. 7, the user client determines at step S37 whether the user BGM selection button displayed on the display device 5A has already been clicked by the user. If so (YES determination at step S37), the client terminal goes to step S38, where the music piece data pertaining to the BGM music piece or effect tone data selected by the user on the above-mentioned listing display screen are read out from the external storage device 7 (or 25) and sent to the tone generator circuit (T.G.) 6 (or tone generator 31B) so that tone signals corresponding to the music piece data or effect tone data are generated by the generator circuit 6 (or tone generator 31B) to be sounded via a speaker. If, on the other hand, the user BGM selection button has not yet been clicked by the user (NO determination at step S37), the client terminal goes to step S39. At step S39, music piece data or effect tone data associated with currently displayed paragraphs or frames are sequentially read out from the external storage device 7 (or 25) and sent to the tone generator circuit 6 (or tone generator 31B) so that tone signals corresponding to the music piece data or effect tone data are generated by the generator circuit 6 (or tone generator 31B) to be sounded via the speaker. Further, if any of the displayed sentences has an effect tone pasted thereto, the effect tone is sounded through the speaker in a similar manner. Note that the music piece data or effect tone data already associated with visual displays, to be sounded at step S39, may be either those selected and delivered through the processing by the server MS as described above or those selected through processing by the client terminal as will be described later.

At step S40, a determination is made as to whether the up/down scroll key has been depressed or manipulated. If the up/down scroll key has not been manipulated (NO determination at step S40), the client terminal jumps to step S47. If the up/down scroll key has been manipulated (YES determination at step S40) and there is any portion in the data section remaining to be displayed, the sentence line or frame display is scrolled upward or downward by an amount corresponding to the number of times the scroll key has been manipulated or time length of the scroll key manipulation, at step S41. In this way, it is possible to change a displayed range, on the display device 5A, of the novel or comic using the scroll key. At next step S42, it is further determined whether any new paragraph or frame has shown up on the display device 5A as a result of the displayed range change by the scroll key. If any new paragraph or frame has shown up (YES determination at step S42) and the user BGM selection button has already been clicked by the user (YES determination at step S44), and if a plurality of BGM music pieces have been selected by the user, the client terminal, at step S44A, shifts to a next BGM music piece by sequentially read out next BGM music piece data from the external storage device 7 (or 25) and sending the read-out BGM music piece data to the tone generator circuit 6 (or tone generator 31B) so that tone signals corresponding to the music piece data are generated by the generator circuit 6 (or tone generator 31B) to be sounded via the speaker. If any new paragraph or frame has shown up (YES determination at step S42) but the user BGM selection button has not yet been clicked by the user (NO determination at step S44), the client terminal goes to step S44A, where music piece data associated with the newly displayed paragraph or frame are sequentially read out from the external storage device 7 (or 25) and sent to the tone generator circuit 6 (or tone generator 31B) so that tone signals corresponding to the music piece data are generated by the generator circuit 6 (or tone generator 31B) to be sounded via the speaker.

At step S45, a further determination is made as to whether any sentence line having an effect tone pasted thereto has now been displayed above a predetermined sentence line on the display device 5A. With a NO determination at step S45, the client terminal jumps to step S48. If any sentence line having an effect tone pasted thereto has now been displayed above the predetermined sentence line (YES determination at step S45) and the user BGM selection button has been clicked by the user (YES determination at step S46), the client terminal goes to step S47, where tone data of a predetermined effect tone are read out from the external storage device 7 (or 25) and sent to the tone generator circuit 6 (or tone generator 31B) so that tone signals corresponding to the music piece data are generated by the generator circuit 6 (or tone generator 31B) to be sounded via the speaker in a similar manner to the tone data for the paragraph or frame. At next step S48, a determination is made as to whether an instruction has been given for reading a next data section or next novel or next comic. If such an instruction has been given (YES determination at step S48), the client terminal reverts to step S31 in order to repeat the above-described operations of steps S31 to S48. If no instruction has been given for reading a next data section or next novel or next comic (NO determination at step S48) and the end button has been depressed (YES determination at step S49), the client terminal terminates the reproduction process. If no instruction has been given for reading a next data section or next novel or next comic (NO determination at step S48) and the end button has not been depressed (NO determination at step S49), the client terminal reverts to step S40 in order to repeat the above-described operations of steps S40 to S49.

The above-described operations permits selection of BGM music pieces and effect tones matching specific substance or scenes of a novel, comic or the like in accordance with scrolling of the displayed range, on the display device 5A, of the novel, comic or the like. Thus, the instant embodiment allows the user to sequentially read portions of the novel, comic or the like while listening to BGM music pieces and effect tones matching various scenes of the novel, comic or the like.

Note that such BGM music pieces and effect tones matching various scenes of the novel, comic or the like may be sounded at other timing than the above-described display timing. For example, at timing when the user has manipulated a cursor to move, word by word, to the position of a word at the beginning of a predetermined sentence, a corresponding BGM music piece and effect tone may be sounded. Alternatively, at timing when the user has manipulated the cursor to move, line by line, to the position of a predetermined line, a corresponding BGM music piece and effect tone may be sounded.

It should be appreciated that desired ones of a plurality of music piece data sets already stored in the memory 7 (or 25) of the client terminal may be selected by the user of the client terminal so that a reproduction sequence made up of the thus-selected desired music piece data sets can be set, as necessary, by the user with respect to a novel or comic downloaded from the server MS; in this case, the reproduction sequence may be a random sequence. Further, the client terminal may be provided with a word analyzing section that performs an operation corresponding to the operation of step S16 of FIG. 5, i.e. that analyzes the text data or text/image data of a novel or comic so as to associate the analyzed results with tone data of the music pieces and effect tones. In such a case, there may be used content of music pieces and effect tones stored in the memory 7 (or 25) of the client terminal, or necessary content of music pieces and effect tones may be downloaded from the server. Furthermore, desired content of music pieces and effect tones may be selected in the client terminal using an associating table rather than the word analyzing means.

It should also be appreciated that the tone data for generating BGM music pieces and effect tones may be in any desired format, such as: the "event plus absolute time" format where the time of occurrence of each performance event is represented by an absolute time within the music piece or a measure thereof; the "event plus relative time" format where the time of occurrence of each performance event is represented by a time length from the immediately preceding event; the "pitch (rest) plus note length" format where each performance data is represented by a pitch and length of a note or a rest and a length of the rest; or the "solid" format where a memory region is reserved for each minimum resolution of a performance and each performance event is stored in one of the memory regions that corresponds to the time of occurrence of the performance event.

The operation at step S16 of FIG. 5, directed to associating music piece content or effect tone content to text/image content, can be modified as necessary, without being necessarily limited to the example of FIG. 6 where the text data are analyzed per predetermined time. As one modification, there may be provided in advance an associating table that defines items of music piece content or effect tone content to be imparted to great many items of suppliable text/image content, and step 16 of FIG. 5 may refer to the associating table, in accordance with an item of text/image content selected in the client terminal, to search for optimal of music piece content or effect tone content and thereby create an HTML file having the selected item of text/image content and optimal content of music piece or effect tone content associated (linked) with each other. In such a case, the associating table may be arranged in such a manner that a plurality of different items of music piece content or effect tone content are associated with a same item of text/image content so that a desired one of the plurality of different items of music piece content or effect tone content can be selected in accordance with a user's selecting instruction or any one of the items of music piece content or effect tone content can be selected randomly in response to a given random signal. Such an arrangement can effectively overcome monotonousness that may undesirably arise from using a predetermined associating table.

Further, even in the case where the text data are analyzed per predetermined time, the content association may involve some monotonousness if an analyzing algorithm and an algorithm for associating items of music piece content or effect tone content in accordance with results of the analysis are fixed. To avoid such an inconvenience, it is preferable that a random selection operation be inserted at any suitable location within the step sequence of FIG. 6. For example, there may be provided a plurality of analyzing algorithms to be used at step S21 and/or step S23 of FIG. 6 so that any desired one of the analyzing algorithms can be selected randomly or on the basis of a suitable control signal and the thus-selected analyzing algorithm can be used for the analysis. In an alternative, there may be provided a plurality of associating algorithms to be used at step S22 and/or step S24 of FIG. 6 so that any desired one of the associating algorithms can be selected randomly or on the basis of a suitable control signal and the associating operation can be carried out using the selected associating algorithm. In another alternative, there may be extracted a plurality of items of music piece content and/or effect tone content as candidate content, and any desired item of music piece content and/or effect tone content may be selected from among the candidates randomly or on the basis of a suitable control signal.

Further, whereas the embodiments have been described in relation to the case where a plurality of Web sites are provided by a single information distributing server MS, the present invention is not so limited; for example, a plurality of Web sites may of course be provided by a plurality of information distributing servers MS. Further, the site supplying text/image content and the site supplying music piece content and/or effect tone content need not necessarily be run by a same person or computer apparatus.

Figure 9:
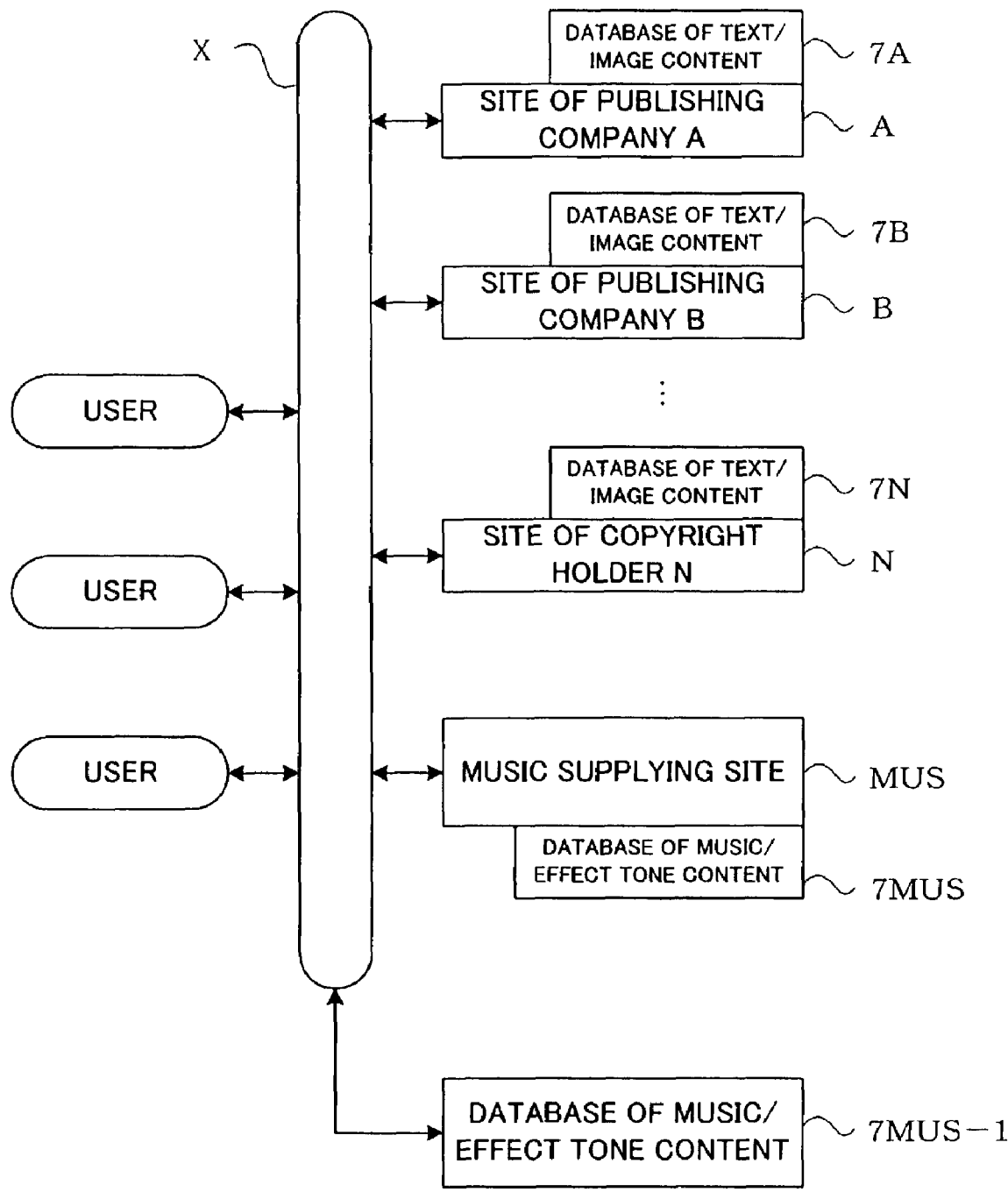
FIG. 9 is a block diagram showing another example of the setup of the information communication system.

For example, in an environment where a plurality of Web sites, such as different publishing companies or copyright holders A, B, . . . , N, are connected to the communication network X via respective information distributing servers, a music content supplying site MUS, separate from the above-mentioned Web sites, may be connected to the communication network X via a given information distributing server, as illustratively shown in a system setup diagram of FIG. 9. For example, in the sites of the publishing companies or copyright holders A, B, . . . , N, there may be provided respective databases 7A, 7B, . . . , 7N containing items of text/image content suppliable by the sites. Alternatively, these databases 7A, 7B, . . . , 7N may be installed in any suitable place as long as they can be managed (linked) by the corresponding sites. Further, the music content supplying site MUS may be provided with a database 7MUS containing items of music piece content and/or effect tone content; in this case, the database 7MUS containing items of music piece content and/or effect tone content may be connected to the communication network X in such a manner that it can be managed (linked) by the music content supplying site MUS.

As one exemplary method for managing the inventive information communication system shown in FIG. 9, the functions of the information distributing server MS pertaining to the present invention as shown in FIG. 5 may be assigned to the music content supplying site MUS. In this case, an interested user first accesses a home page of the music content supplying site MUS and thereby obtains a listing of items of text/image content suppliable by the individual sites of the publishing companies or copyright holders A, B, . . . , N (see steps S2 and S9 of FIG. 5). Then, in response to selection by the user, the information distributing server MS of the music content supplying site MUS receives a desired item of text/image content from any one of the sites of the publishing companies or copyright holders A, B, . . . , N and performs an analysis on the received data to determine appropriate items of music piece content and/or effect tone content to be associated with the received desired item of text/image content. Then, the server MS of the music content supplying site MUS retrieves the thus-determined items of music piece content and/or effect tone content from the database 7MUS or 7MUS-1, and then supplies the user with a file having the desired item of text/image content imparted with the appropriate items of music piece content and/or effect tone content (see steps S13-S18 of FIG. 5).

As another example of the method for managing the inventive system shown in FIG. 9, the music content supplying site MUS may be assigned an entry function for the information distributing server MS pertaining to the present invention as shown in FIG. 5, and the analysis of a user selected item of text/image content, etc. may be assigned to the information distributing server MS of any one of the sites of the publishing companies or copyright holders A, B, . . . , N which supplies the selected item of text/image content. In this case, an interested user first accesses the home page of the music content supplying site MUS and thereby obtains a listing of items of text/image content suppliable by the individual sites of the publishing companies or copyright holders A, B, . . . , N (see steps S2 and S9 of FIG. 5). Then, in response to selection by the user, the information distributing server MS of one of the sites of the publishing companies or copyright holders A, B, . . . , N which supplies the selected item of text/image content performs an analysis on the the text/image data to determine appropriate items of music piece content and/or effect tone content to be associated with the user desired item of text/image content. Then, the server MS of the one site retrieves the thus-determined items of music piece content and/or effect tone content from the database 7MUS or 7MUS-1 of the music content supplying site MUS, and then supplies the user with a file having the desired item of text/image content imparted with the appropriate items of music piece content and/or effect tone content (see steps S13-S18 of FIG. 5).

As still another example of the method for managing the inventive system shown in FIG. 9, the functions of the information distributing server MS pertaining to the present invention as shown in FIG. 5 may be assigned to the site of each of the publishing companies or copyright holders A, B, . . . , N. In such a case, an interested user first accesses a home page of the site of the desired publishing company or copyright holder A, B, . . . , N and thereby obtains a listing of items of text/image content suppliable by the site of the publishing company or copyright holder A, B, . . . , N (see steps S2 and S9 of FIG. 5). Then, in response to selection by the user, the information distributing server MS of the site of the publishing company or copyright holder A, B, . . . , N which supplies the selected item of text/image content performs an analysis on the text/image data to determine appropriate items of music piece content and/or effect tone content to be associated with the user desired item of text/image content. Then, the server MS of the site of the publishing company or copyright holder A, B, . . . , N retrieves the thus-determined items of music piece content and/or effect tone content from the database 7MUS or 7MUS-1 of the music content supplying site MUS, and then supplies the user with a file having the desired item of text/image content imparted with the appropriate items of music piece and/or effect tone content (see steps S13-S18 of FIG. 5).

With the above-described system management method, the music content supplying site MUS can be linked to the sites of the publishing companies or copyright holders A, B, . . . , N in accordance with the present invention, and thus any one of the sites of the publishing companies or copyright holders A, B, . . . , N, which have heretofore been capable of only supplying text/image content, is also allowed to supply any interested user with desired text/image content having imparted thereto music piece content and/or effect tone content well matching the desired text/image content. As a result, the present invention can supply or sell content with enhanced added value.

In summary, the present invention is characterized by analyzing a novel, comic or the like to randomly select tone data of BGM music pieces, effect tones and/or the like corresponding to the analyzed novel, comic or the like and then delivering text data or text/image data of the novel, comic or the like along with the selected corresponding tone data. Such arrangements allow an interested user to read the novel, comic or the like while listening musical tones and/or effect tones matching the atmosphere of various scenes of the novel, comic or the like. Therefore, the present invention achieves the benefit that the user can enjoy reading the novel, comic or the like with enhanced feelings while being immersed deep into the story.

The present invention relates to the subject matter of Japanese Patent Application No. 2001-101892 filed Mar. 30, 2001, the disclosure of which is expressly incorporated herein by reference in its entirety.

What is claimed is:

1. A server apparatus for communicating with a client terminal via a communication network, said server apparatus supplying, in response to a request from the client terminal, visual content including at least one of text data and image data to the client terminal, said server apparatus comprising:

a communication section connectable to a client terminal via the communication network; and a processor coupled with said communication section and adapted to:

receive, via said communication section, an acquisition request for visual content from the client terminal on the communication network;

retrieve, from a database, data of the visual content requested by the client terminal;

determine music content or effect tone content to be imparted to the requested visual content in associated relation to specific substance of the requested visual content;

retrieve data of the determined music content or effect tone content from a database; and perform control to transmit, via said communication section, the data of the visual content and the data of the music content or effect tone content, retrieved from the databases, to the client terminal on the communication network, wherein said processor determines said music content or effect tone content by performing an analysis of the visual content requested by the client terminal and, on the basis of a result of the analysis, selecting, from among various items of music content or effect tone content contained in the databases, the music content or effect tone content to be imparted to the requested visual content, and wherein said analysis of the requested visual content performed by said processor analyzes at least one of text data and image data of the requested visual content for each of predetermined sections thereof and thereby detects, for each predetermined section, atmosphere suitable for the specific substance of the requested visual content, and whereby music content or effect tone content matching the detected atmosphere is selected for each of the predetermined sections.

2. A server apparatus as claimed in claim 1 wherein the database storing a plurality of data sets representing items of visual content and the database storing a plurality of data sets representing items of music content or effect tone content are attached to said server apparatus or provided on the communication network in such a manner that the databases can be accessed by said server apparatus.

3. A client terminal apparatus for communicating with a server apparatus via a communication network, said client terminal apparatus receiving visual content including at least one of text data and image data, said client terminal apparatus comprising:

a communication section connectable to a server apparatus via the communication network;

a content designating device operable for a user to designate visual content which the user desires to acquire;

a display device;

a tone generator mechanism; and a processor coupled with said communication section, said content designating device, said display device and said tone generator, said processor being adapted to:

send, via said communication section, an acquisition request for the visual content, designated via said content designating device, to a server apparatus on the communication network;

receive, via said communication section, data of the requested visual content transmitted by the server apparatus on the communication network in response to the acquisition request, wherein the server apparatus performs an analysis of the requested visual content and, on the basis of a result of the analysis, selects, from among various items of music content or effect tone content contained in a databases, the music content or effect tone content to be imparted to the requested visual content, wherein said analysis of the requested visual content performed by said server apparatus analyzes at least one of text data and image data of the requested visual content for each of predetermined sections thereof and thereby detects, for each predetermined section, atmosphere suitable for the specific substance of the requested visual content, and whereby music content or effect tone content matching the detected atmosphere is selected for each of the predetermined sections, and wherein the server apparatus transmits data of the requested visual content, along with data of the selected music content or effect tone content, to said client terminal apparatus via the communication network, said processor also receiving, via said communication section, the data of the music content or effect tone content; and on the basis of the data received from the server apparatus via said communication section, cause said display device to display the visual content and cause said tone generator mechanism to audibly reproduce the music content or effect tone content.

4. A client terminal apparatus for communicating with a server apparatus via a communication network, said client terminal apparatus receiving visual content including at least one of text data and image data, said client terminal apparatus comprising:
   a communication section connectable to a server apparatus via the communication network;
   a content designating device operable for a user to designate content including at least one of text data and image data which the user desires to acquire;
   a memory storing a plurality of items of music content or effect tone content;
   a display device;
   a tone generator; and
   a processor coupled with said communication section, said content designating device, said display device and said tone generator, said processor being adapted to:
      send, via said communication section, an acquisition request for the visual content, designated via said content designating device, to a server apparatus on the communication network;
      receive, via said communication section, data of the requested visual content transmitted by the server apparatus on the communication network in response to the acquisition request;
      perform an analysis of the received data of the requested visual content; and on the basis of a result of the analysis, select, from among various items of music content or effect tone content contained in said memory, the music content or effect tone content to be imparted to the visual content, wherein said analysis of the requested visual content performed by said processor analyzes at least one of text data and image data of the requested visual content for each of predetermined sections thereof and thereby detects, for each predetermined section, atmosphere suitable for the specific substance of the requested visual content, and whereby music content or effect tone content matching the detected atmosphere is selected for each of the predetermined sections; and
      cause said display device, on the basis of the data received from the server apparatus via said communication section, to display the visual content including at least one of text data and image data and cause said tone generator to audibly reproduce the selected music content or effect tone content.

5. A client terminal apparatus as claimed in claim 4 wherein said prdcessor selects, from said memory, music content or effect tone content corresponding to the content including at least one of text data and image data received from the server apparatus.

6. A client terminal apparatus as claimed in claim 4 wherein said processor is further adapted to select a plurality of items of music content or effect tone content and also set a reproduction sequence of the selected items of music content or effect tone content, and wherein said processor causes said display device, on the basis of the data received from the server apparatus via said communication section, to display the content including at least one of text data and image data and causes said tone generator to sequentially audibly reproduce the selected items of music content or effect tone content in accordance with the set reproduction sequence while the content including at least one of text data and image data is being displayed by said display device.

7. A client terminal apparatus as claimed in claim 4 wherein the server apparatus determines music content or effect tone content to be imparted to the requested content including at least one of text data and image data in associated relation to specific substance of the requested visual content, and transmits data of the requested content including at least one of text data and image data, along with data of the determined music content or effect tone content, to said client terminal apparatus via the communication network,
   said client terminal apparatus receives, via said communication section, the data of the requested content including at least one of text data and image data and the data of the determined music content or effect tone content transmitted by the server apparatus via the communication network, and
   wherein said processor of said client terminal apparatus is further adapted to make a selection as to which of the music content or effect tone content read out from said memory and the music content or effect tone content received via said communication section should be reproduced.

8. A client terminal apparatus for communicating with a server apparatus via a communication network, said client terminal apparatus receiving visual content including at least one of text data and image data, said client terminal apparatus comprising:
   a communication section connectable to a server apparatus via the communication network;
   a content designating device operable for a user to designate visual content including at least one of text data and image data which the user desires to acquire;
   a memory storing a plurality of music content or effect tone content;
   a display device;
   a tone generator; and
   a processor coupled with said communication section, said memory, said content designating device, said display device and said tone generator, said processor being adapted to:
      send, via said communication section, an acquisition request for the visual content, designated via said content designating device, to a server apparatus on the communication network;

receive, via said communication section, data of the visual content transmitted by the server apparatus on the communication network in response to the acquisition request;

perform an analysis of the visual content and, on the basis of a result of the analysis, select, from among various items of music content or effect tone content stored in the memory, the music content or effect tone content to be imparted to the requested visual content, wherein said analysis of the requested visual content performed by said processor analyzes at least one of text data and image data of the requested visual content for each of predetermined sections thereof and thereby detects, for each predetermined section, atmosphere suitable for the specific substance of the requested visual content, and whereby music content or effect tone content matching the detected atmosphere is selected for each of the predetermined sections;

cause said display device to progressively display the received visual content, a predetermined partial range of the visual content at a time; and cause said tone generator to audibly reproduce the music content or effect tone content while simultaneously controlling a reproduced range of the music content or effect tone content in accordance with a change in the partial range of the content being displayed by said display device.

9. A client terminal apparatus as claimed in claim 8 wherein the server apparatus determines music content or effect tone content to be imparted to the requested content including at least one of text data and image data in associated relation to specific substance of the requested visual content, and transmits data of the requested content including at least one of text data and image data, along with data of the determined music content or effect tone content, to said client terminal apparatus via the communication network, said client terminal apparatus receives, via said communication section, the data of the requested content including at least one of text data and image data and the data of the determined music content or effect tone content transmitted by the server apparatus via the communication network, and wherein said memory stores the data of the determined music content or effect tone content received via said communication section.

10. A method for use in a server apparatus for communicating with a client terminal via a communication network to supply, in response to a request from the client terminal, visual content including at least one of text data and image data to the client terminal, said method comprising:

a step of receiving an acquisition request for desired visual content from the client terminal via the communication network;

a step of retrieving, from a database, data of the visual content requested by the client terminal;

a step of performing an analysis of the visual content and, on the basis of a result of the analysis, selecting, from among various items of music content or effect tone content stored in a memory, the music content or effect tone content to be imparted to the requested visual content;

a step of retrieving data of the music content or effect tone content, determined by said step of performing, from said memory; and a step of performing control to transmit the data of the visual content and the data of the music content or effect tone content, retrieved from the databases, to the client terminal via the communication network, wherein said step of performing an analysis of the visual content analyzes at least one of text data and image data of the requested visual content for each of predetermined section thereof and thereby detects, for each predetermined section, atmosphere suitable for the specific substance of requested visual content, and whereby said music content or effect tone content matching the detected atmosphere is selected for each of the predetermined sections.

11. A method for use in a client terminal for communicating with a server apparatus via a communication network to receive, from the server apparatus, visual content including at least one of text data and image data, said method comprising:

a step of designating visual content which a user desires to acquire;

a step of sending an acquisition request for the visual content, designated by said step of designating, to a server apparatus via the communication network;

a step of receiving data of the requested visual content transmitted by the server apparatus via the communication network, wherein the server apparatus determines music content or effect tone content to be imparted to the requested visual content in associated relation to specific substance of the requested visual content, and transmits data of the requested visual content, along with data of the determined music content or effect tone content, to said client terminal via the communication network, said step of receiving also receiving the data of the determined music content or effect tone content; and a step of, on the basis of the data received from the server apparatus by said step of receiving, visually displaying the visual content and audibly reproducing the music content or effect tone content, wherein said server performs an analysis of the visual content requested by the client terminal and, on the basis of a result of the analysis, selects, from among various items of music content or effect tone content contained in the databases, the music content or effect tone content to be imparted tothe requested visual content, and wherein said analysis of the requested visual content performed by said server apparatus analyzes at least one of text data and image data of the requested visual content for each of predetermined sections thereof and thereby detects, for each predetermined section, atmosphere suitable for the specific substance of the requested visual content, and whereby music content or effect tone content matching the detected atmosphere is selected for each of the predetermined sections.

12. A method for use in a client terminal for communicating with a server apparatus via a communication network to receive, from the server apparatus, visual content including at least one of text data and image data, said method comprising:

a step of designating visual content including at least one of text data and image data which a user desires to acquire;

a step of sending an acquisition request for the visual content, designated by said step of designating, to a server apparatus via the communication network;

a step of receiving data of the requested visual content transmitted by the server apparatus via the communication network in response to the acquisition request;

a step of performing an analysis of the requested visual content and, on the basis of a result of the analysis, selecting, from among various items of music content or effect tone content stored in a memory, the music content or effect tone content to be imparted to the requested visual content; and a step of, on the basis of the data received from the server apparatus by said step of receiving, displaying the visual content including at least one of text data and image data and, simultaneously with display of the visual content including at least one of text data and image data, audibly reproducing the music content or effect tone content selected by said of selecting, wherein said step of performing an analysis of the requested visual content analyzes at least one of text data and image data of the requested visual content for each of predetermined sections thereof and thereby detects, for each predetermined section, atmosphere suitable for the specific substance of the requested visual content, and whereby music content or effect tone content matching the detected atmosphere is selected for each of the predetermined sections.

13. A method for use in a client terminal for communicating with a server apparatus via a communication network to receive, from the server apparatus, visual content including at least one of text data and image data, said method comprising:

a step of designating visual content including at least one of text data and image data which a user desires to acquire;

a step of sending an acquisition request for the visual content, designated by said step of designating, to a server apparatus via the communication network;

a step of receiving data of the visual content transmitted by the server apparatus via the communication network in response to the acquisition request;

a step of performing an analysis of the requested visual content and, on the basis of a result of the analysis, selecting, from among various items of music content or effect tone content stored in a memory, the music content or effect tone content to be imparted to the requested visual content;

a step of supplying music content or effect tone content corresponding to the visual content received from the server apparatus by said step of receiving, the music content or effect tone content supplied being selected by said step of performing;

a step of progressively displaying the received visual content, a predetermined partial range of the visual content at a time; and a step of audibly reproducing the music content or effect tone content supplied by said step of supplying, said step of audibly reproducing controlling a reproduced range of the music content or effect tone content in accordance with a change in the partial range of the visual content being displayed by said step of progressively displaying, wherein said step of performing an analysis of the requested visual content analyzes at least one of text data and image data of the requested visual content for each of predetermined sections thereof and thereby detects, for each predetermined section, atmosphere suitable for the specific substance of the requested visual content, and whereby music content or effect tone content matching the detected atmosphere is selected for each of the predetermined sections.

14. A storage medium comprising program instructions that are computer-executable for performing all the steps of claim 10 when said program is run on a computer.

15. A storage medium comprising program instructions that are computer-executable for performing all the steps of claim 11 when said program is run on a computer.

16. A storage medium comprising program instructions that are computer-executable for performing all the steps of claim 12 when said program is run on a computer.

17. A storage medium comprising program instructions that are computer-executable for performing all the steps of claim 13 when said program is run on a computer.

18. A server apparatus as claimed in claim 1 wherein said analysis of the requested visual content performed by said processor includes:

a first analysis which analyzes at least one of text data and image data of the requested visual content for a first predetermined section thereof and thereby detects, for the first predetermined section, atmosphere suitable for the specific substance of the requested visual content, and whereby said music content matching the detected atmosphere is selected for the first predetermined section; and a second analysis which analyzes at least one of text data and image data of the requested visual content for a second predetermined section thereof and thereby detects, for the second predetermined section, atmosphere suitable for the specific substance of the requested visual content, and whereby said effect tone content matching the detected atmosphere is selected for the second predetermined section.

19. A server apparatus as claimed in claim 1 wherein said analysis of the requested visual content is performed by said processor in a random manner.

20. A server apparatus as claimed in claim 1, which further comprises a table storing correspondence between various visual content and music content or effect tone content impartable thereto, and wherein said processor determines said music content or effect tone content to be imparted to the requested visual content, by referring to said table in accordance with the requested visual content.

21. A server apparatus as claimed in claim 20 wherein said processor performs to randomly select music content or effect tone content from among a plurality of the music content or effect tone content, impartable to the requested visual content, stored in said table.

* * * * *